United States Patent
Gaw

(10) Patent No.: US 7,672,678 B2
(45) Date of Patent: Mar. 2, 2010

(54) LOCATION-BASED COMMUNICATION SYSTEM

(75) Inventor: Stephen Gaw, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 647 days.

(21) Appl. No.: 11/534,147

(22) Filed: Sep. 21, 2006

(65) Prior Publication Data

US 2007/0230385 A1    Oct. 4, 2007

Related U.S. Application Data

(60) Provisional application No. 60/787,733, filed on Mar. 29, 2006.

(51) Int. Cl.
*H04W 24/00* (2009.01)
*H04M 11/04* (2006.01)
*H04M 3/42* (2006.01)
*H04B 7/00* (2006.01)
*H04H 20/71* (2008.01)

(52) U.S. Cl. .............. 455/456.1; 455/404.2; 455/414.2; 455/527; 370/312

(58) Field of Classification Search .............. 455/404.2, 455/456.1; 370/338
See application file for complete search history.

(56) References Cited

U.S. PATENT DOCUMENTS

| | | | |
|---|---|---|---|
| 5,432,542 | A | 7/1995 | Thibadeau et al. |
| 5,948,043 | A | 9/1999 | Mathis |
| 6,032,053 | A | 2/2000 | Schroeder et al. |
| 6,867,688 | B2 | 3/2005 | Lamb |
| 2002/0086676 | A1* | 7/2002 | Hendrey et al. .............. 455/445 |
| 2005/0096065 | A1* | 5/2005 | Fleischman ............... 455/456.1 |
| 2006/0133338 | A1* | 6/2006 | Reznik et al. ................ 370/338 |
| 2006/0229058 | A1* | 10/2006 | Rosenberg ............... 455/404.2 |

FOREIGN PATENT DOCUMENTS

| | | |
|---|---|---|
| EP | 1209886 | 5/2002 |
| GB | 2363289 A | 12/2001 |
| GB | 2404115 | 1/2005 |
| GB | 2406468 A | 3/2005 |
| WO | 9605678 | 2/1996 |
| WO | 0022860 A1 | 4/2000 |
| WO | 0174034 A2 | 10/2001 |
| WO | 0186508 | 11/2001 |
| WO | 0219741 | 3/2002 |

OTHER PUBLICATIONS

International Search Report—PCT/US06/037128, International Search Authority—Eurpean Patent Office—Jan. 11, 2007.
Written Opinion—PCT/US06/037128, International Search Authority—Eurpean Patent Office—Jan. 11, 2007.

* cited by examiner

*Primary Examiner*—Nick Corsaro
*Assistant Examiner*—Larry Sternbane
(74) *Attorney, Agent, or Firm*—Andrea L. Mays; Jimmy Cheng

(57) ABSTRACT

A communication system for limiting communication between communication terminals based, at least in part, upon a separation between communication terminals is disclosed. A first communication channel is coupled with a first communication terminal, where the first communication terminal includes a transmitter. A second communication channel coupled with a second communication terminal, where the second communication terminal includes a receiver. A separation determining function finds a distance between the first and second communication terminals. A distance squelch analyzes the distance to prevent use of a message by the receiver.

28 Claims, 10 Drawing Sheets

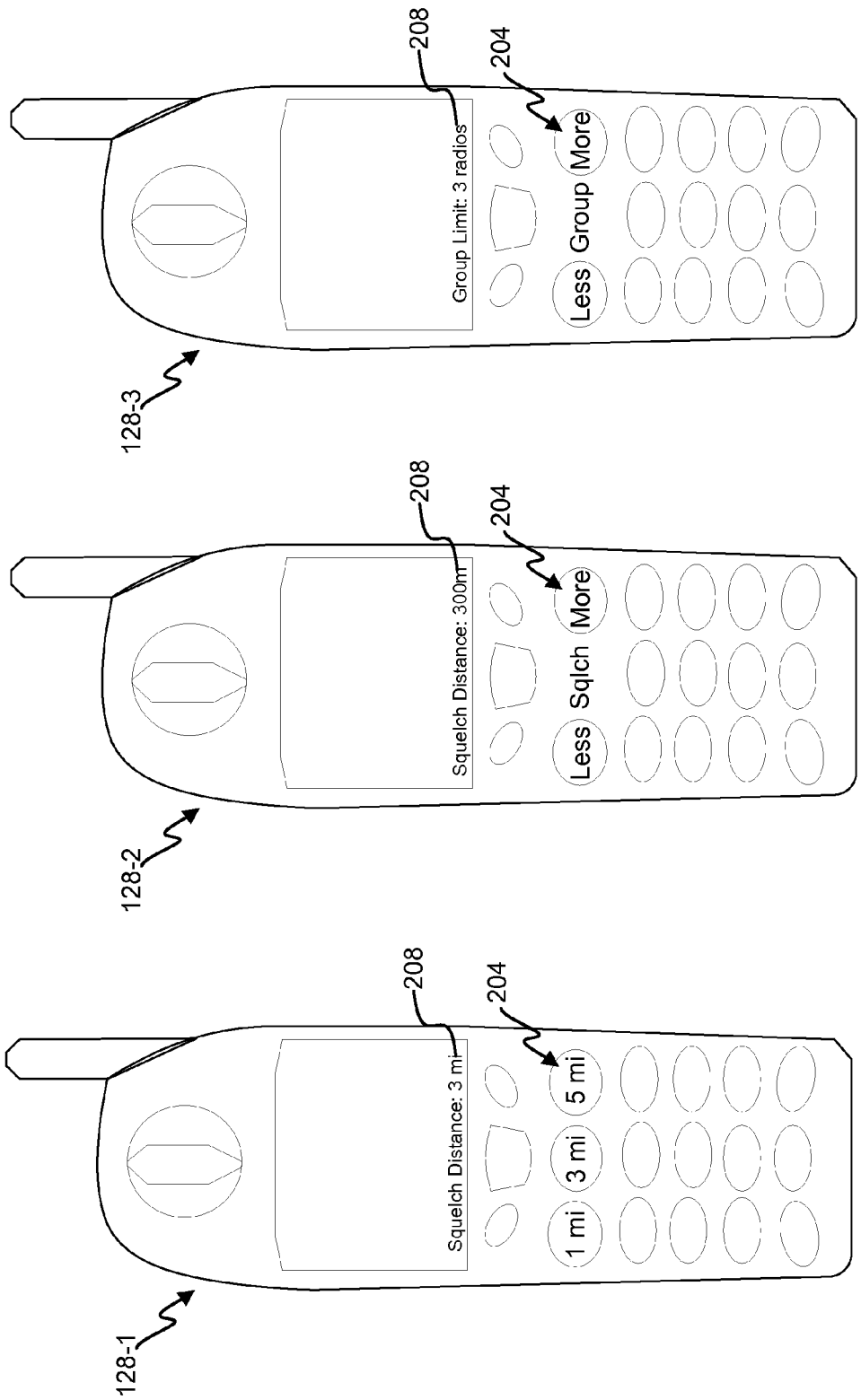

LOCATION-BASED COMMUNICATION SYSTEM

RELATED APPLICATIONS

This application claims priority to U.S. Provisional Application Ser. No. 60/787,733 filed on Mar. 29, 2006, entitled "LOCATION-BASED COMMUNICATION CONTROL SYSTEM" which is assigned to the assigner hereof and which is hereby expressly incorporated by reference in its entirety for all purposes.

This application is related to U.S. patent application Ser. No. 11/534,065, filed on Sep. 21, 2006 entitled "GEOGRAPHY-BASED FILTERING OF BROADCASTS," which is assigned to the assigner hereof and hereby expressly incorporated by reference in its entirety for all purposes.

BACKGROUND

This disclosure relates in general to communication systems and to location-aware communication systems amongst other things.

Wireless handheld radios communicate with each other so long as there is sufficient signal to discern the received signal. Some handheld radios allow adjusting the sensitivity to received signals using a knob that is called a squelch. Received signals of lower power can be filtered out by the squelch. The squelch function is not tied to distance between handheld radios, but signal strength, which may not correlate well to the distance.

There are family radios (i.e., FRS or GMRS band radios) and wireless phones that include a global positioning system (GPS) receiver. These devices can both communicate and determine location. The location and communication functions are often not tightly coupled in most circumstances. Some family radios with GPS allow communicating locations of radios to other radios nearby. During emergency phone calls, the location of the wireless phone can be identified and relayed to emergency responders to allow responders to locate the caller.

Limiting communication between first responders to emergencies allows efficient communication without interference. A squelch feature can limit analog communication to those signals that are strong from those that are weaker, which may not limit communication precise enough. Consider an example where emergency responders in a tall building use a squelch feature to try to limit communication to those in the building. When near the windows, strong signals will be received from far away given little obstruction, but another responder two floors down may have a very weak signal. Adjusting the squelch will filter those a few floors away, but not someone in line of sight miles away.

SUMMARY

In one embodiment, the present disclosure provides a method for limiting communication between communication terminals based, at least in part, upon a distance between communication terminals. In one step, the distance between two communication terminals is received, where one communication terminal comprises a transmitter and another communication terminal includes a receiver. A communication limit from one of the two communication terminals is received, where the communication limit is at least partially based upon distances. It is determined that the distance exceeds the communication limit. The receiver is prevented from using a communication of the transmitter. Use of the communication at a plurality of other receivers that comply with the communication limit is allowed.

In another embodiment, the present disclosure provides a communication device for limiting communication between communication terminals based, at least in part, upon a separation between communication terminals. The communication device includes a processor and a memory. The processor is configured to receive a message from a transmitter, retrieve a distance to the transmitter, and actively prevent delivery of the message based upon the position of the processor with respect to a predetermined region. The memory is coupled with the processor.

In yet another embodiment, the present disclosure provides a communication system for limiting communication between communication terminals based, at least in part, upon a distance between communication terminals. The communication system includes means for receiving a first distance between two communication terminals, means for receiving a communication limit from one of the two communication terminals, means for determining that the first distance is greater than the second distance such that the communication limit is exceeded, and means for preventing a receiver from using a communication sent from a transmitter to the receiver. One communication terminal includes the transmitter and another communication terminal comprises the receiver. The communication limit includes the second distance.

In yet another embodiment, the present disclosure provides a communication system for limiting communication between communication terminals based, at least in part, upon a separation between communication terminals. A first communication channel is coupled with a first communication terminal, where the first communication terminal includes a transmitter. A second communication channel coupled with a second communication terminal, where the second communication terminal includes a receiver. A separation determining function finds a distance between the first and second communication terminals. A distance squelch analyzes the distance to prevent use of a message by the receiver.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIGS. 2A, 2B and 2C depict diagrams of embodiments of a wireless terminal;

Figure 1:
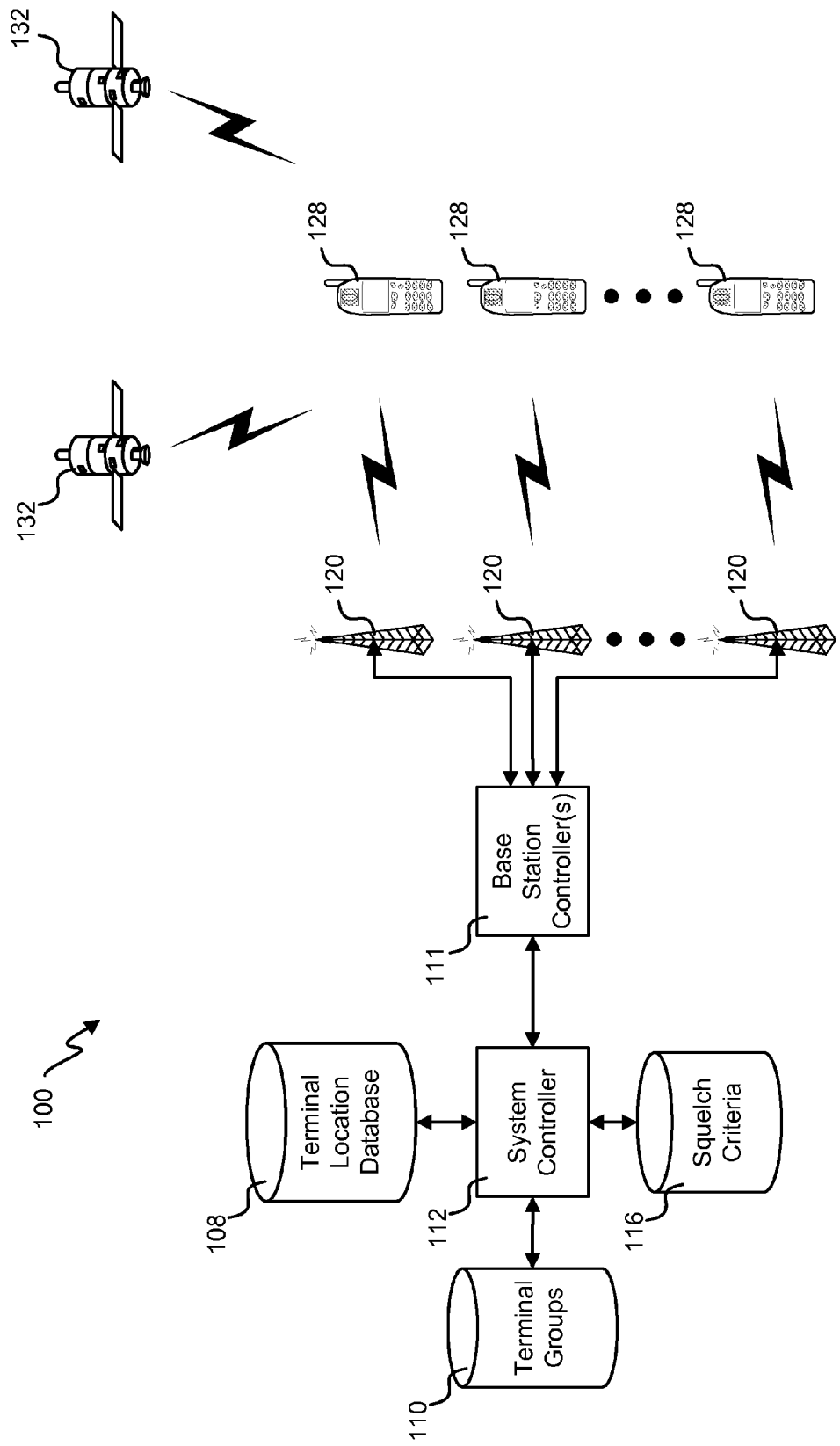
FIG. 1 depicts a block diagram of an embodiment of a communication system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flow chart or diagram may describe the operations as a sequential process, many of the operations can be performed in parallel or concurrently. In addition, the order of the operations may be re-arranged. A process is terminated when its operations are completed, but could have additional steps or blocks not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof When implemented in software, firmware, middleware or microcode, the program code or code segments to perform the necessary tasks may be stored in a machine readable medium such as storage medium. A processor(s) may perform the necessary tasks. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Referring first to FIG. 1, a block diagram of an embodiment of a communication system 100 is shown. In this embodiment, there are a number of mobile terminals 128 that are location aware. By location aware, it is meant that knowledge of location for mobile terminals 128 is present in the system 100 or can be determined. The mobile terminals 128 can communicate with others based upon their location relative to those others and other criteria. The mobile terminals 128 use satellites 132 to determine position (e.g., GLONASS, GPS, Galileo, EGNOS, Globalstar, IRIDIUM). Other embodiments could use ranging with base stations 120 to determine location or other known location determining methods. Some embodiments determine the position of the mobile terminal at the mobile terminal 128, the base station 120 and/or some other location.

Wherever the location is determined, a terminal location database 108 stores the location of the mobile terminals 128. The location may be in 2D or 3D. Coordinates, street address, floor and other descriptors could be used in the terminal location database 108. Further, some embodiments could store a movement vector such that future locations can be estimated, for example, heading of 165 degrees at 30 miles per hour. As the location changes, the terminal location database 108 is kept current.

Each mobile terminal 128 or group of mobile terminals can have one or more squelch criteria stored in a corresponding database 116. The squelch criteria can be specified in a number of ways. Generally, the squelch criteria can be the closest number of wireless terminals, the wireless terminals that are closest and traveling toward the wireless terminal, a circular area, a spherical area, a custom-shaped area, a geographic boundary, and/or the wireless terminals likely to arrive the first given the street traveling on. For example, the wireless terminal may communicate with the five closest other wireless terminals, but that number can be adjusted at the wireless terminal. In another example, the other wireless terminals within a three mile area, that are not traveling away from the wireless terminal, are those in the communication group of the wireless terminal.

The squelch criteria database 116 can define groups that the criteria applies to and those that might be exempt. For example, all the mobile terminals in a fellow officer group that are located in the city limits might hear a message. The sergeant could be excepted from this criteria to hear all messages regardless of location. A mobile terminal may communicate with other mobile terminals outside a criteria defined from its present location. For example, all wireless terminals more than five miles from a crime scene could be instructed to not respond.

By knowing the squelch criteria and terminal locations, a system controller 112 can group the terminals for a particular wireless terminal. These groupings can be done beforehand or when a message or stream of information arrives for distribution. Any changes to area and/or group size made by the wireless terminal 128 is communicated to the system controller 112 and changes the terminal group database 110. For example, wireless terminal may initiate a voice broadcast that has a squelch criteria 116 of a circular area of radius three miles. The system controller 112 would reference the terminal location database 108 to find the relevant other mobile terminals to receive the broadcast. That grouping would be stored in the terminal group database 110 to ease further broadcasts. Updates to the groupings could be performed periodically.

The system controller 112 includes a processor and memory to perform functions. Functions of the system controller 112 could be distributed throughout a network and system. In this embodiment, the system controller 112 covers all or some of the base stations 120 for a particular geographic area or network, but could communicate with other system controllers 112 for other areas or network.

This embodiment includes any number of base station controllers 111 coupled to the system controller 112 and base stations 120. The base station controller 111 is used to communicate data and conversations with a wide area network and the phone system. The system controller 112 would indicate to the one or more base station controller 111, which wireless terminals 128 should receive a particular message. In other embodiments, the grouping decisions could be made in one or more base station controllers 111 rather than the system controller 112, for example.

With reference to FIGS. 2A, 2B and 2C, diagrams of embodiments of a wireless terminal 128 are shown. Each embodiment has a location-related squelch selection 204 and a squelch display 208. The first embodiment of the wireless terminal 128-1 in FIG. 2A has three preset communication ranges of 1, 3 or 5 miles, which are selectable 204 in the alternative. In a second embodiment 128-2 of FIG. 2B, two buttons 204 can be used to increase or decrease the communication distance. Group size is selectable in the third embodiment 128-3 to specify the closest wireless terminals that are included in the group. The display 208 indicates the selection 204 that is entered with the keypad.

Figure 3A:
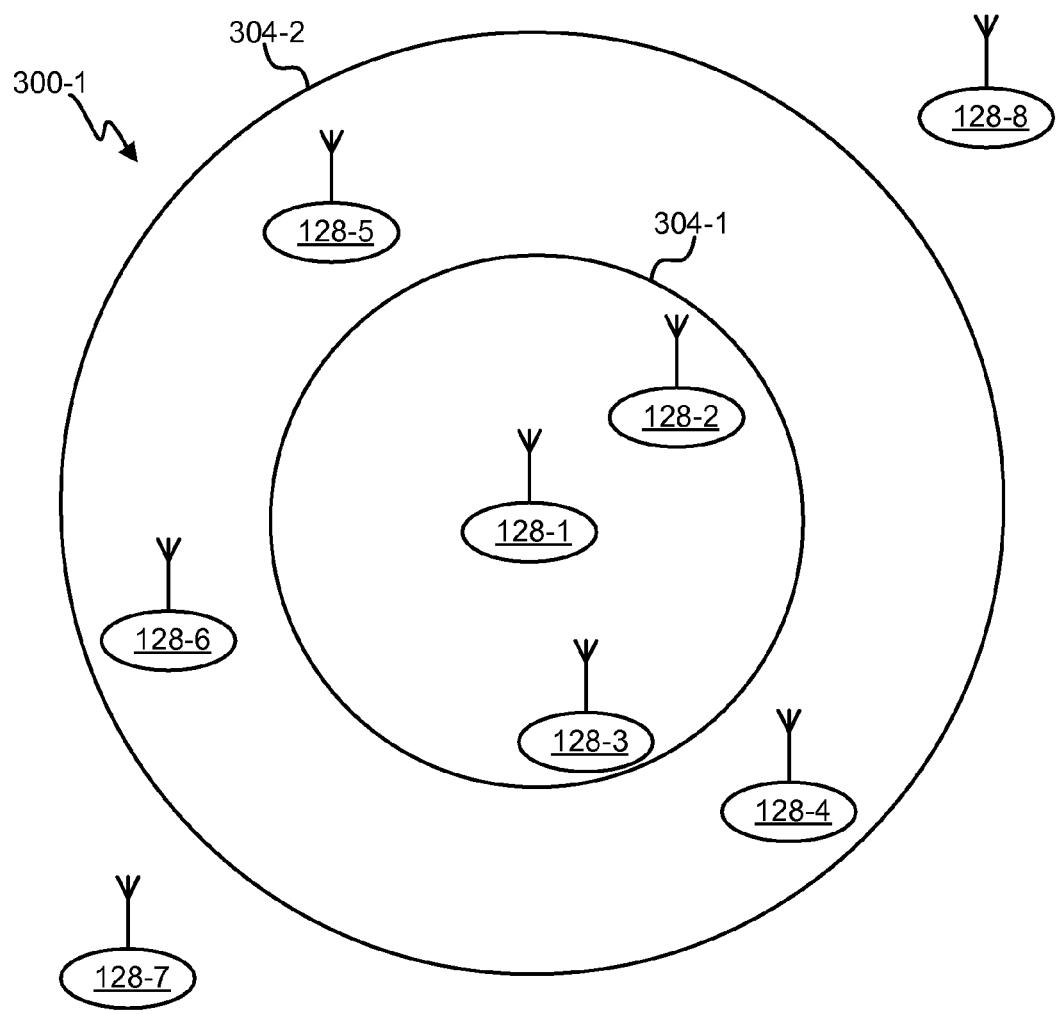
FIGS. 3A-3E depict block diagrams of embodiments of a terminal map.

Referring next to FIG. 3A, a block diagram of an embodiment of a terminal map 300-1 is shown. This map 300 shows communication terminals 128 according to their geographic placement. There are two circular squelch areas 304 that a transmitting communication terminal 128-1 can select. A first squelch area 304-1 is smaller than a second squelch area 304-2. Within the first area 304-1, a second and third communication terminals 128-2, 128-3 can receive the transmission from the first communication terminal 128-1 when the squelch is set to the smaller area 304-1. Should the larger squelch area 304-2 be selected, there are three additional communication terminals 128-4, 128-5, 128-6 that can be communicated with. The larger squelch area 304-2 increases the receivers from two to five.

Figure 3B:
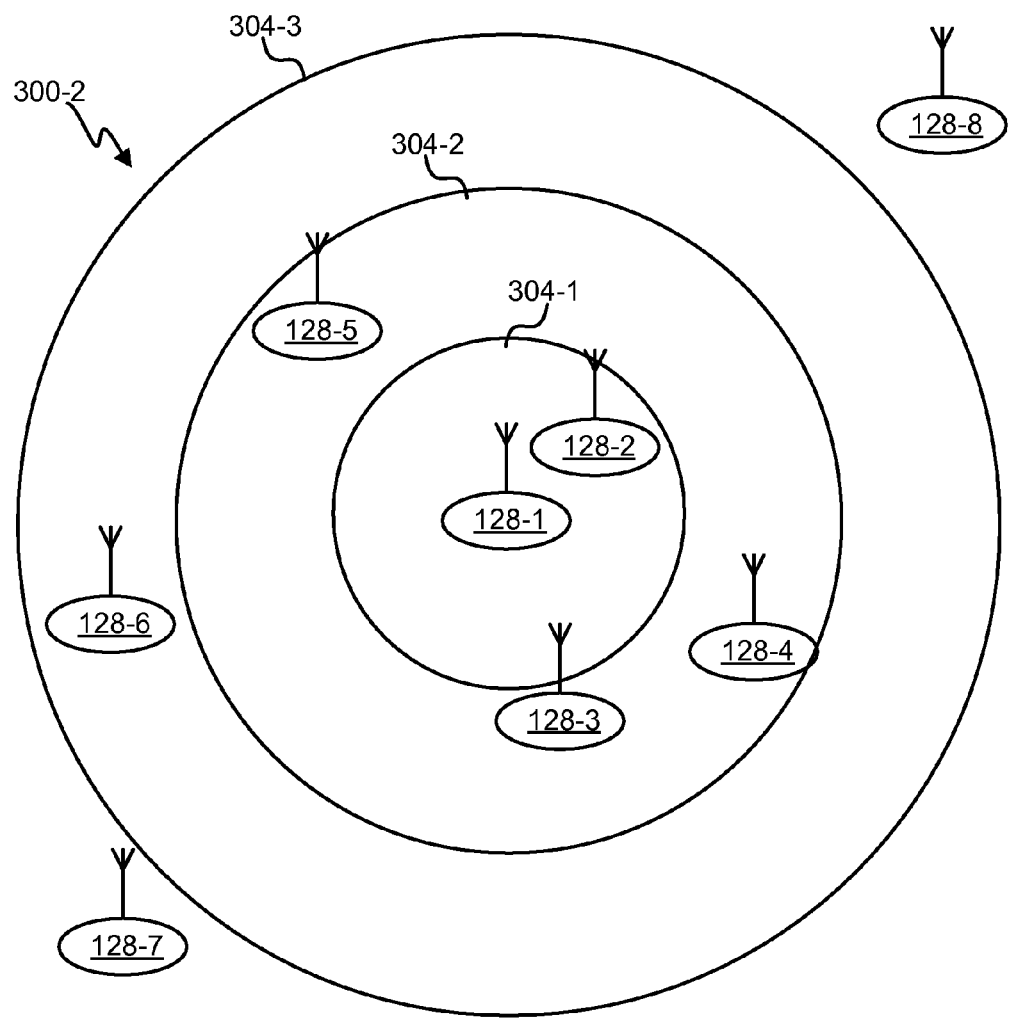

With reference to FIG. 3B, a block diagram of another embodiment of the terminal map 300-2 is shown. This embodiment has three squelch areas 304. The first area 304-1 includes one communication terminal 128-2 to receive a broadcast, the second area 304-2 includes four communication terminals 128-2, 128-3, 128-4, 128-5, and the third area 304-3 includes five communication terminals 128-2, 128-3, 128-4, 128-5, 128-6. Two communication terminals 128-7, 128-8 are excluded from communication in any squelch mode, but could be selectively included. When the squelch is deactivated, communication with all eight communication terminals is possible 128-2, 128-3, 128-4, 128-5, 128-6, 128-7, 128-8.

Figure 3C:
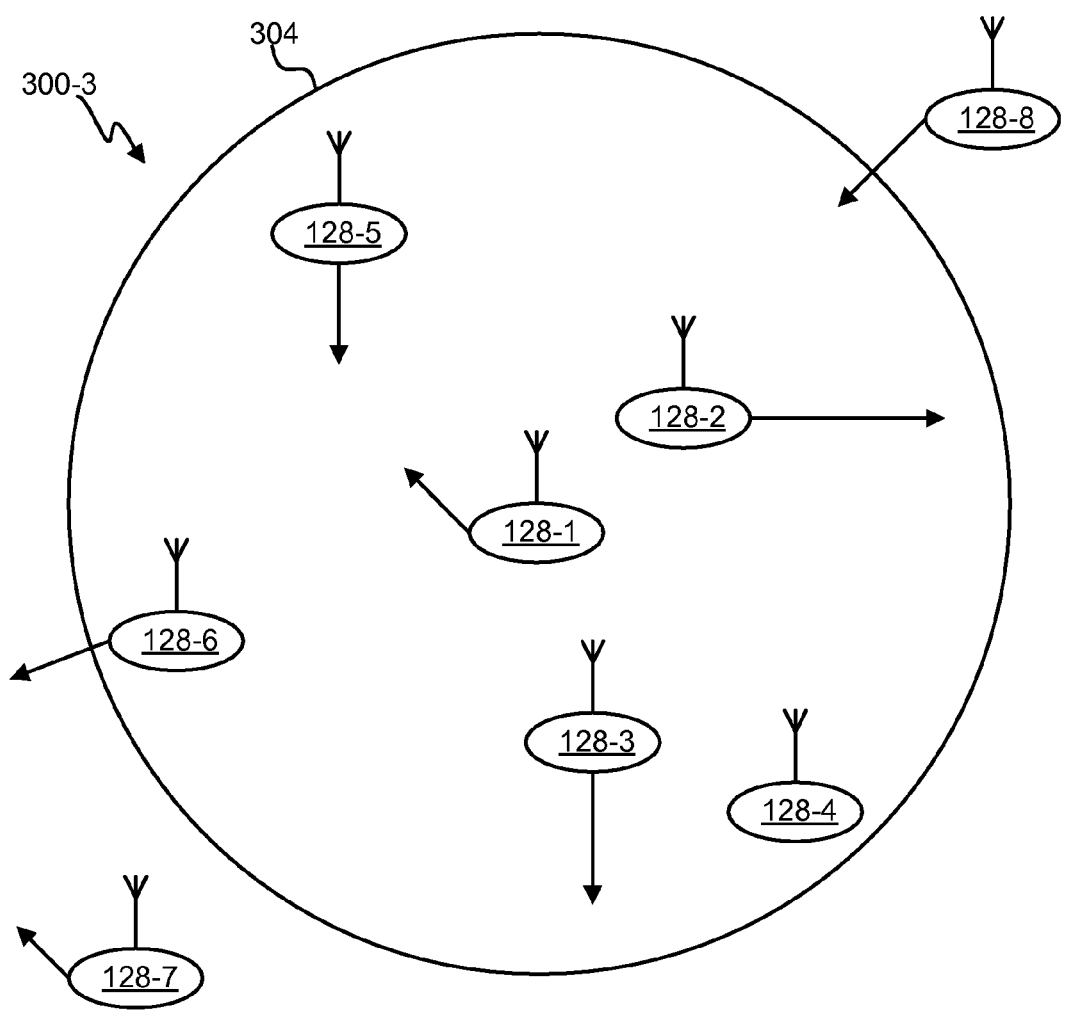

Referring next to FIG. 3C, a block diagram of yet another embodiment of the terminal map 300-3 is shown. In this embodiment, the terminal location database 108 also stores a movement vector for communication terminals 128 that are in motion. A squelch threshold could define a circular area 304, but specify to include only those communication terminals in that area 304 traveling toward the broadcasting communication terminal 128-1. In the depicted example, only one wireless terminal 128-5 is traveling toward the transmitting terminal 128-1. In another example, the criteria specifies all communication terminals that will be in the area at some time in the future. For example, the sixth terminal 128-6 is just about out of the area 304 and the eighth terminal 128-8 will soon be in the area 304 such that the sixth terminal 128-6 would be excluded and the eighth 128-8 would be included.

Figure 3D:
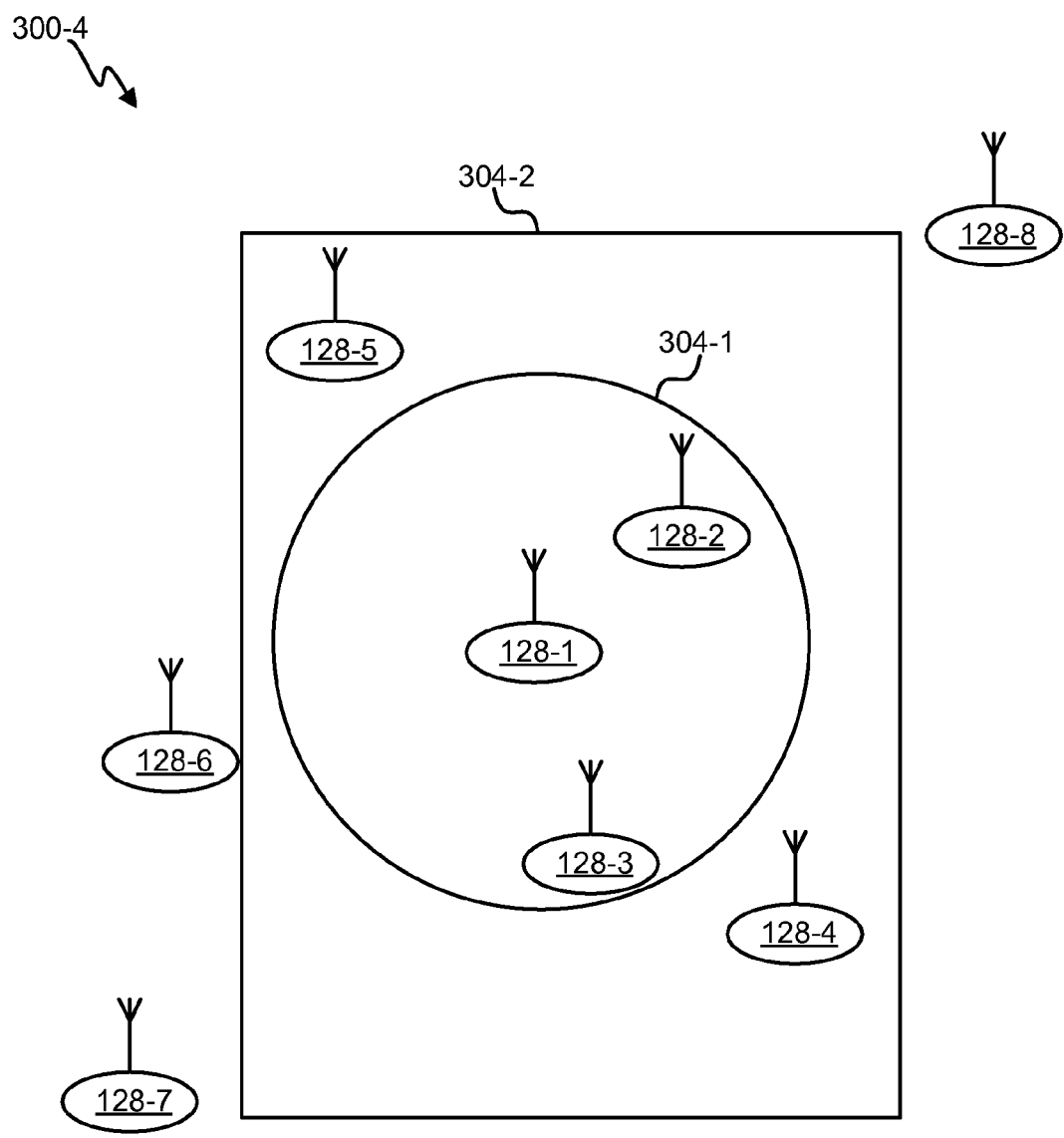

With reference to FIG. 3D, a block diagram of still another embodiment of the terminal map 300-4 is shown. In this embodiment, the selectable areas have different geometries. For example, the first area 304-1 could be a circular area radially extending from the transmitting terminal 128-1, but the second area 304-2 is defined by a map of the county limits. The first terminal 128-1 could use the push-to-talk feature of her phone to contact nearby officers, but then open up communication to all officers in the county. In some cases, a message is first sent in the smaller area and then automatically to the larger area if there is no response. For example, a distress signal could be sent to ever increasing areas until one responded.

Figure 3E:
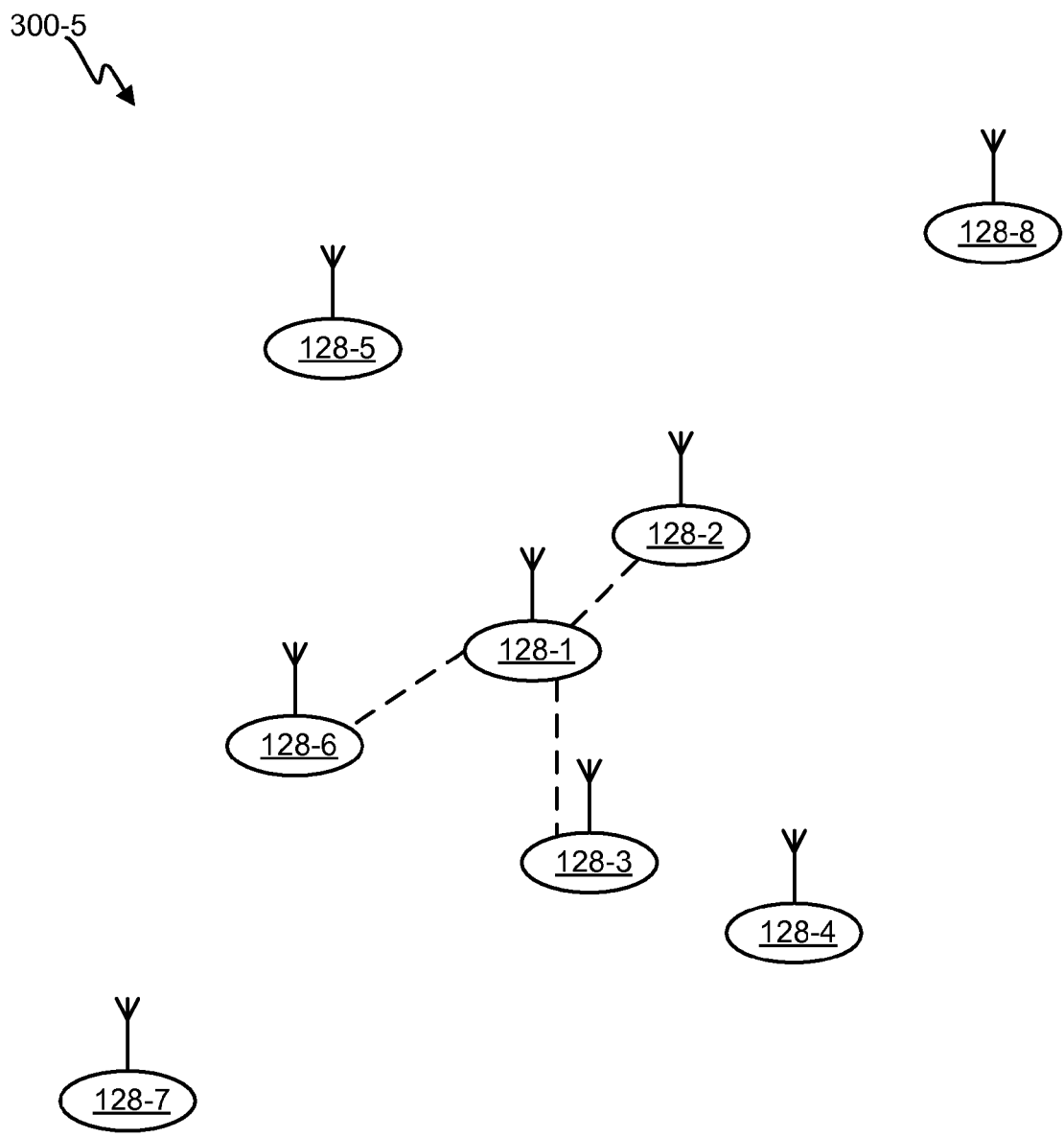

Referring next to FIG. 3E, a block diagram of an embodiment of the terminal map 300-5 is shown. In this embodiment, the squelch criteria is specified by group size. For example, the closest three terminals 128-2, 128-3, 128-6 could be included in the group initially. By adjusting controls on the terminal, the group size could be increased or decreased. The system controller 112 can determine the group as the selected size changes. The distances could be measured in two or three dimensions.

Each of the receiving terminals may have their own squelch criteria. Alternatively, they could organize around a grouping similar to the first terminal to initiate squelch mode. For example, if the first radio initiates a call to cabs that are nearby, all those cabs in the group could respond to the first radio, but others could not hear. The group initiated by the first radio would be used for responses. A potential responder could break out of the group by adjusting squelch on their radio to a preset value.

Figure 4A:
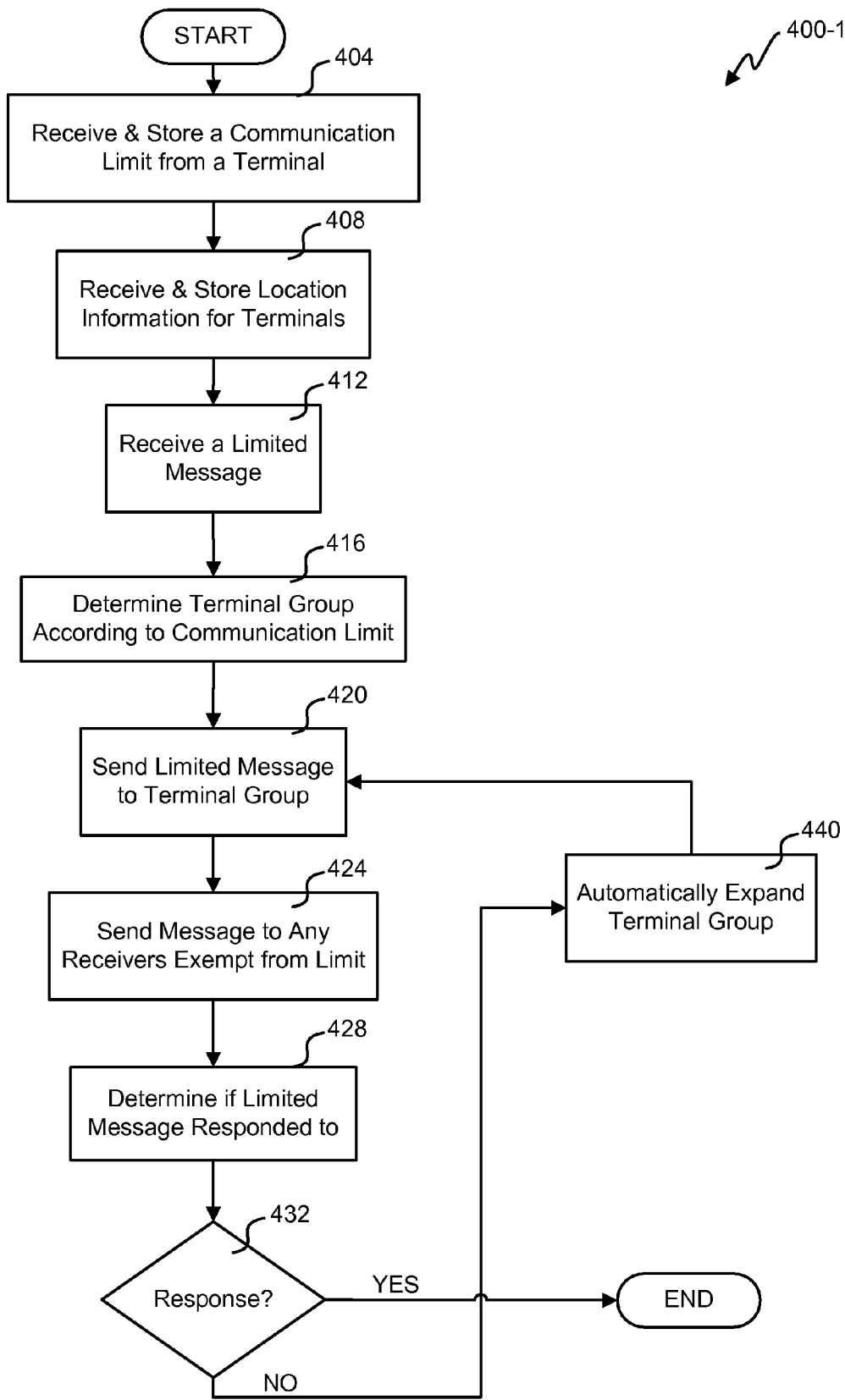
FIGS. 4A and 4B illustrate flowcharts of embodiments of a process for selectively communicating according to some location-based criteria.

With reference to FIG. 4A, a flowchart of an embodiment of a process 400-1 for selectively communicating according to some location-based criteria is illustrated. In this embodiment, some terminals 128 can be exempted from communication limits and the limit can be automatically expanded. The depicted portion of the process begins in block 404 where a terminal 128 sends a communication limit. The system controller 112 receives this limit and stores it in the squelch criteria database 116. This is performed for all terminals 128 that can squelch their broadcast feature.

In block 408, the system controller 112 receives location information for the terminals 128 and stores those locations in the terminal location database 108. Updates are also reported and stored. In this embodiment, the terminals 128 determine and report location, but other embodiments could determine location of terminals at the base stations 120 or in a combined process using base stations 120 and terminals 128.

In block 412, a limited message is received. The message could be data, video and/or sound that is sent as a file or stream. For example, it could be a walkie-talkie voice transmission. The group of terminals 128 to receive the transmission is determined in block 416. The system controller 112 confers with the squelch criteria and terminal location databases 116, 108 to find the group. The grouping can be stored in the terminal group database 110. In block 420, the message is sent to the group.

Additionally, the squelch criteria database 116 may have indicated some terminals 128 exempt from any communication limit. Those exempt terminals would be included in the group and sent the message in block 424. It is determined if the limited message is responded to and/or received by the terminals 128 in the group. For example, the group members may have been out of reception or simply decided to not respond. Where no respond is determined in block 432, the terminal group is expanded to include more area or members in block 440 before looping back to block 420. Where there is a response or terminal that received it, the process of sending a message ends.

Figure 4B:
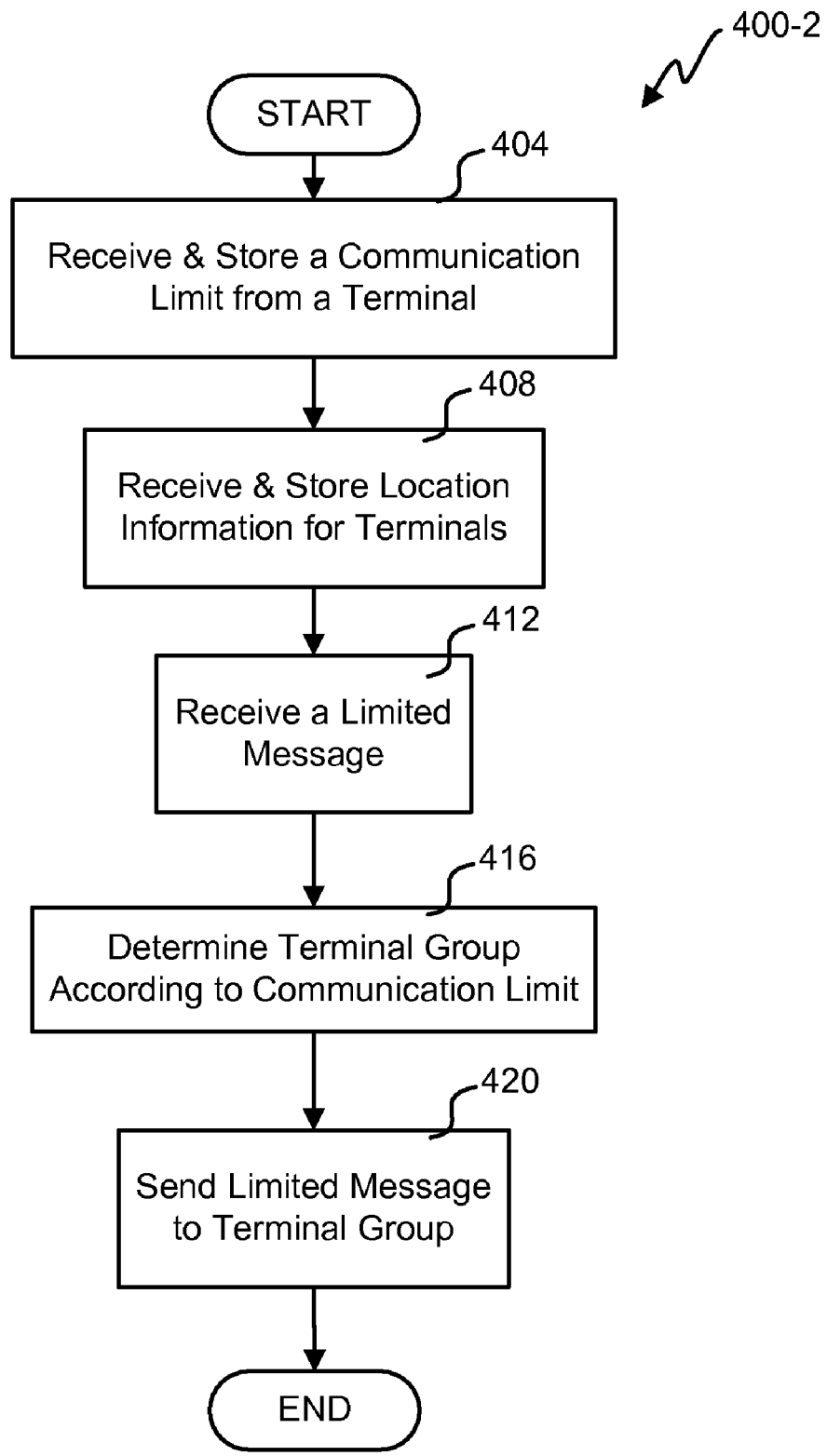

Referring next to FIG. 4B, a flowchart of an embodiment of a process 400-2 for selectively communicating according to some location-based criteria is illustrated. This embodiment includes block 404, 408, 412, 416 and 420 as FIG. 4A, but ends after block 420. Having terminals exempt from the limit are not supported by this embodiment as is the automatic expansion of the group.

Figure 5:
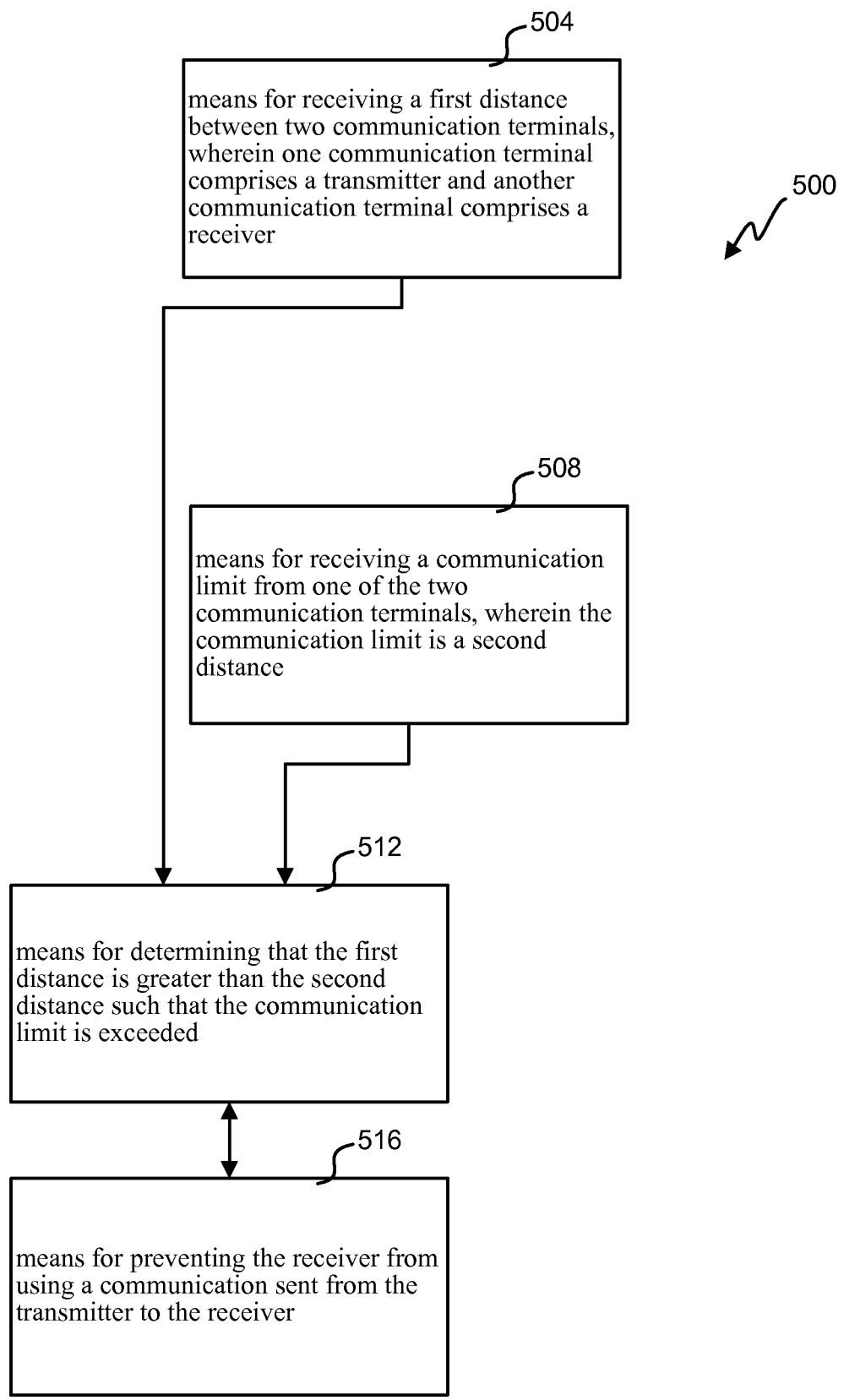
FIG. 5 depicts a block diagram of an embodiment of a communication system for limiting communication.

With reference to FIG. 5, a block diagram of an embodiment of a communication system 500 for limiting communication is depicted. The communication system 500 can limit communication between communication terminals based, at least in part, upon a distance between communication terminals. The communication system 500 includes means for receiving a first distance between two communication terminals 504, means for receiving a communication limit from one of the two communication terminals 508, means for determining that the first distance is greater than the second distance such that the communication limit is exceeded 512, and means for preventing a receiver from using a communication sent from a transmitter to the receiver 516. One communication terminal includes the transmitter and another communication terminal comprises the receiver. The communication limit includes the second distance.

A number of variations and modifications of the disclosed embodiments can also be used. For example, the wireless terminals could be wired and/or not normally movable. For example, one embodiment could have VOIP terminals with location-awareness. A message could be sent to all VOIP terminals within a region or distance from sender. In another example, the transmitter could send a television signal received by too many receivers. The receivers that were outside a region or too distant would not use the signal received. Some of the embodiments discuss squelching broadcasts or multicasts, but other embodiments could squelch singlecasts based upon location.

The techniques described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques, processes and functions described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

While the principles of the disclosure have been described above in connection with specific apparatuses and methods, it is to be clearly understood that this description is made only by way of example and not as limitation on the scope of the disclosure.

What is claimed is:

1. A method for limiting communication between communication terminals based, at least in part, upon a distance between communication terminals, the method comprising steps of:
    storing locations of each of two communications terminals;
    receiving the distance between two communication terminals based on the stored locations, wherein one communication terminal comprises a transmitter and another communication terminal comprises a receiver;
    receiving a communication limit from one of the two communication terminals, wherein the communication limit is at least partially based upon distances;
    determining that the distance exceeds the communication limit;
    determining that the another communication terminal is not a member of a group that is exempt from the communication limit;
    preventing the receiver from using a communication of the transmitter; and
    allowing use of the communication at a plurality of other receivers that comply with the communication limit.

2. The method for limiting communication between communication terminals as recited in claim 1, further comprising a step of determining the distance between the two communication terminals.

3. The method for limiting communication between communication terminals as recited in claim 2, wherein the step of determining the first distance uses ranging signal from at least one of two communication terminals.

4. The method for limiting communication between communication terminals as recited in claim 2, wherein the step of determining the first distance uses geo-positioning.

5. The method for limiting communication between communication terminals as recited in claim 1, wherein the communication limit is at least partially based upon a number of receivers.

6. The method for limiting communication between communication terminals as recited in claim 1, further comprising a step of allowing a second receiver to use the communication even though outside the communication limit, wherein the second receiver is exempt from the communication limit.

7. The method for limiting communication between communication terminals as recited in claim 1, further comprising a step of increasing the communication limit if the receiver does not respond.

8. The method for limiting communication between communication terminals as recited in claim 1, wherein:
    the communication limit defines an area around a communication terminal, and
    communication between the communication terminal and any other communication terminals in the cell is allowed where all communication terminals are in the area.

9. The method for limiting communication between communication terminals as recited in claim 1, wherein:
    the communication limit defines a number of communication terminals, and
    communication between the communication terminal and any other communication terminals is allowed for the closest communication terminals up to the communication limit.

10. The method for limiting communication between communication terminals as recited in claim 1, wherein:
    the communication limit defines a number of communication terminals, and communication between the communication terminal and any other communication terminals is allowed up to the communication limit for communication terminals likely to arrive quickest given a street map.

11. A communication system for limiting communication between communication terminals based, at least in part, upon a separation between communication terminals, the communication system comprising:
a first communication channel coupled with a first communication terminal, wherein the first communication terminal comprises a transmitter;
a second communication channel coupled with a second communication terminal, wherein the second communication terminal comprises a receiver;
a terminal location database configured to store a location of the first and second communication terminals;
a squelch criteria database configured to store squelch criteria and at least one group of communication terminals to which the squelch criteria applies and a second group to which the squelch criteria does not apply;
a separation determining function that determines a distance between the first and second communication terminals;
a distance squelch that analyzes the distance and stored squelch criteria for the group including the first and second communication terminal to prevent use of a message by the receiver.

12. The communication system for limiting communication between communication terminals as recited in claim 11, wherein the first and second communication terminals communicate wirelessly.

13. The communication system for limiting communication between communication terminals as recited in claim 11, wherein the first communication terminal is a cellular phone.

14. The communication system for limiting communication between communication terminals as recited in claim 11, wherein the first communication terminal is a handheld radio.

15. The communication system for limiting communication between communication terminals as recited in claim 11, wherein the first and second communication terminals can operate in a walkie-talkie mode to broadcast to other communication terminals.

16. The communication system for limiting communication between communication terminals as recited in claim 11, wherein locations for the first and second communication terminals are known.

17. The communication system for limiting communication between communication terminals as recited in claim 11, wherein the message includes video.

18. The communication system for limiting communication between communication terminals as recited in claim 11, wherein the distance squelch prevents the message from being transmitted.

19. The communication system for limiting communication between communication terminals as recited in claim 11, wherein the separation determining function determines the distance by knowing the location of the first and second communication terminals.

20. The communication system for limiting communication between communication terminals as recited in claim 11, wherein the distance squelch is located away from either of the first and second communication terminals.

21. A communication device for limiting communication between communication terminals based, at least in part, upon a separation between communication terminals, the communication device comprising:
a processor configured to:
receive a message from a transmitter,
retrieve a location of the transmitter on a terminal map, determine that the communication device is not a member of a group that is exempt from a communication limit, and
actively prevent use of the message based upon a position of the processor on the terminal map with respect to a predetermined region defined by squelch criteria wherein the predetermined region comprises the communication limit, and wherein the communication limit is based, at least in part, on at least one of: a distance between the location of the transmitter and the position of the processor, a geographic boundary, and/or an area around the transmitter; and
a memory coupled with the processor.

22. The communication device for limiting communication between communication terminals as recited in claim 21, wherein the communication device is a wireless communication device.

23. The communication device for limiting communication between communication terminals as recited in claim 21, wherein the message is a multicast message intended for multiple receivers.

24. The communication device for limiting communication between communication terminals as recited in claim 21, wherein the processor is located remotely from the transmitter.

25. A communication system for limiting communication between communication terminals based, at least in part, upon a distance between communication terminals, the communication system comprising:
means for receiving a first distance between two communication terminals based on a location of each of the two communications terminals, wherein one communication terminal comprises a transmitter and another communication terminal comprises a receiver;
means for receiving a communication limit from one of the two communication terminals, wherein the communication limit includes a second distance;
means for determining that the first distance is greater than the second distance such that the communication limit is exceeded;
means for determining that the receiver is not in a group of communications terminals exempt from the communication limit; and
means for preventing the receiver from using a communication sent from the transmitter to the receiver.

26. The communication system for limiting communication between communication terminals as recited in claim 25, further comprising means for determining the first distance between the two communication terminals.

27. The communication system for limiting communication between communication terminals as recited in claim 26, wherein the means for determining uses geo-positioning to find the first distance.

28. The communication system for limiting communication between communication terminals as recited in claim 25, further comprising means for adjusting the second distance.

* * * * *